(12) United States Patent
Kapil

(10) Patent No.: US 7,496,777 B2
(45) Date of Patent: Feb. 24, 2009

(54) POWER THROTTLING IN A MEMORY SYSTEM

(75) Inventor: Sanjiv Kapil, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 278 days.

(21) Appl. No.: 11/249,099

(22) Filed: Oct. 12, 2005

(65) Prior Publication Data

US 2007/0083701 A1    Apr. 12, 2007

(51) Int. Cl.
G06F 1/32      (2006.01)
G06F 12/00    (2006.01)

(52) U.S. Cl. .................. 713/324; 713/300; 713/310; 713/320; 713/323; 711/5; 711/104; 711/105; 711/106

(58) Field of Classification Search .............. None
See application file for complete search history.

(56) References Cited

U.S. PATENT DOCUMENTS

| | | | |
|---|---|---|---|
| 6,247,084 B1 * | 6/2001 | Apostol et al. ............. 710/108 |
| 6,295,586 B1 | 9/2001 | Novak et al. |
| 6,502,161 B1 | 12/2002 | Perego et al. |
| 6,571,325 B1 | 5/2003 | Satagopan et al. |
| 6,608,476 B1 | 8/2003 | Mirov |
| 6,725,314 B1 | 4/2004 | Dong |
| 6,845,457 B1 | 1/2005 | Mirov |
| 6,882,082 B2 | 4/2005 | Greeff et al. |
| 6,922,770 B2 | 7/2005 | Shanmugasundaram et al. |
| 6,941,428 B2 | 9/2005 | Carr |
| 7,017,022 B2 | 3/2006 | Jeddeloh |
| 7,032,092 B2 | 4/2006 | Lai |
| 7,051,151 B2 | 5/2006 | Perego |
| 2004/0030794 A1 | 2/2004 | Hugly et al. |

(Continued)

FOREIGN PATENT DOCUMENTS

GB    2 416 056 A    1/2006

(Continued)

OTHER PUBLICATIONS

Delaluz et al. (DRAM Energy Management Using Software and Hardware Directed Power Mode Control, 2001 IEEE, ISBN: 0-7695-1019-1/01), pp. 159-169.*

(Continued)

Primary Examiner—Gary J Portka
Assistant Examiner—Kaushikkumar Patel
(74) Attorney, Agent, or Firm—Meyertons Hood Kivlin Kowert & Goetzel, P.C.; Rory D. Rankin

(57) ABSTRACT

A memory system is disclosed. The memory system includes a memory controller coupled to one or more memory modules, at least one of the memory modules including a buffer. The memory controller is configured to convey a command to at least one of the memory modules in response to detecting that no memory requests addressed to the at least one of the memory modules have been received during a specified window of time. In response to the command, the buffer of the at least one of the memory modules is configured to enter a reduced power state. The specified window of time may be either a specified number of memory refresh intervals or buffer sync intervals. The memory controller maintains a count of memory refresh or buffer sync intervals.

24 Claims, 11 Drawing Sheets

U.S. PATENT DOCUMENTS

| | | |
|---|---|---|
| 2004/0114448 A1* | 6/2004 | Johnson et al. ............ 365/227 |
| 2004/0183795 A1 | 9/2004 | Deering et al. |
| 2004/0260957 A1* | 12/2004 | Jeddeloh et al. ............ 713/300 |
| 2005/0198458 A1 | 9/2005 | Cho |
| 2006/0020740 A1 | 1/2006 | Bartley et al. |
| 2006/0024541 A1 | 2/2006 | Weiss et al. |

FOREIGN PATENT DOCUMENTS

| | | |
|---|---|---|
| WO | WO 2004/109528 A3 | 12/2004 |
| WO | WO 2005/066965 A2 | 7/2005 |

OTHER PUBLICATIONS

U.S. Appl. No. 11/124,848, filed May 9, 2005.
U.S. Appl. No. 11/304,166, filed Dec. 15, 2005.
U.S. Appl. No. 11/205,706, filed Aug. 17, 2005.
U.S. Appl. No. 10/975,650, filed Oct. 28, 2004.
U.S. Appl. No. 10/989,577, filed Nov. 16, 2004.
Fully Buffered DIMM (FB-DIMM) Server Memory Architecture: Capacity, Performance, Reliability and Longevity- Feb. 18, 2004- Retrieved from http://www.idt.com/content/OSA_FB-DIMM-arch. pdfVOGT-Note connections of FB-DIMM's on p. 9.

* cited by examiner

POWER THROTTLING IN A MEMORY SYSTEM

BACKGROUND OF THE INVENTION

1. Field of the Invention

This invention relates to computer memory systems and, more particularly, to techniques for reducing power consumption of computer memory systems.

2. Description of the Related Art

Evolving standards for computer memory systems have lead to systems that include greater numbers of higher capacity memory devices. Consequently, computer memory systems have seen an increase in power consumption. One technology in particular, the Fully Buffered Dual Inline Memory Module (FBDIMM), achieves very high memory density by allowing memory modules to be connected in series, rather than in parallel. A parallel architecture suffers from the problem that each additional memory module increases the electrical loading on the parallel data and address buses. The serial point-to-point architecture used by FB-DIMMs overcomes the electrical loading problem since electrical loading is not changed when another module is added. However, the resulting increase in the number of modules that the system can support increases the power consumption of the memory system.

In addition to the above considerations, much of the power dissipated in an FB-DIMM is consumed in the transmitter and receiver circuitry of the bus interfaces. FB-DIMMs are coupled to the serial bus through an Advanced Memory Buffer (AMB) that includes the transmitter and receiver circuitry. In order to facilitate a variety of low-power operating modes, the FB-DIMM specification allows for an AMB's transmitter and receiver circuitry to be placed in a low latency standby (L0s) state. In the L0s state, the transmitter and receiver circuitry for the local FB-DIMM is disabled to save power while signals are allowed to pass through to subsequent FB-DIMMs further down the bus. However, the FB-DIMM specification does not provide guidance on when or through what algorithm to place an AMB in the L0s state. Consequently, what is needed is a mechanism to reduce the power dissipation of individual memory modules within a memory system by selectively placing the AMB's in the L0s state without significantly reducing access speed or increasing latency.

SUMMARY OF THE INVENTION

Various embodiments of a memory system and methods are disclosed. In one embodiment, a memory controller is coupled to one or more memory modules, at least one of the memory modules including a buffer. The memory controller is configured to convey a command to at least one of the memory modules in response to detecting that no memory requests addressed to the at least one of the memory modules have been received during a specified window of time. In response to the command, the buffer of the at least one of the memory modules is configured to enter a reduced power state.

In one embodiment, the specified window of time comprises a specified number of memory refresh intervals. The memory controller is further configured to maintain a count of memory refresh intervals and, each time the count reaches the specified number, determine whether or not any memory requests addressed to the at least one of the memory modules have been received during an immediately preceding window of time equal in duration to the specified window of time.

In a further embodiment, the memory controller is further configured to restart the running count of memory refresh intervals in response to detecting that either a memory request addressed to the at least one of the memory modules has been received, or the count has reached the specified number.

In another embodiment, the specified window of time comprises a specified number of buffer sync intervals. The memory controller is further configured to maintain a count of buffer sync intervals and, each time the count reaches the specified number, determine whether or not any memory requests addressed to the at least one of the memory modules have been received during an immediately preceding window of time equal in duration to the specified window of time.

Figure 1:
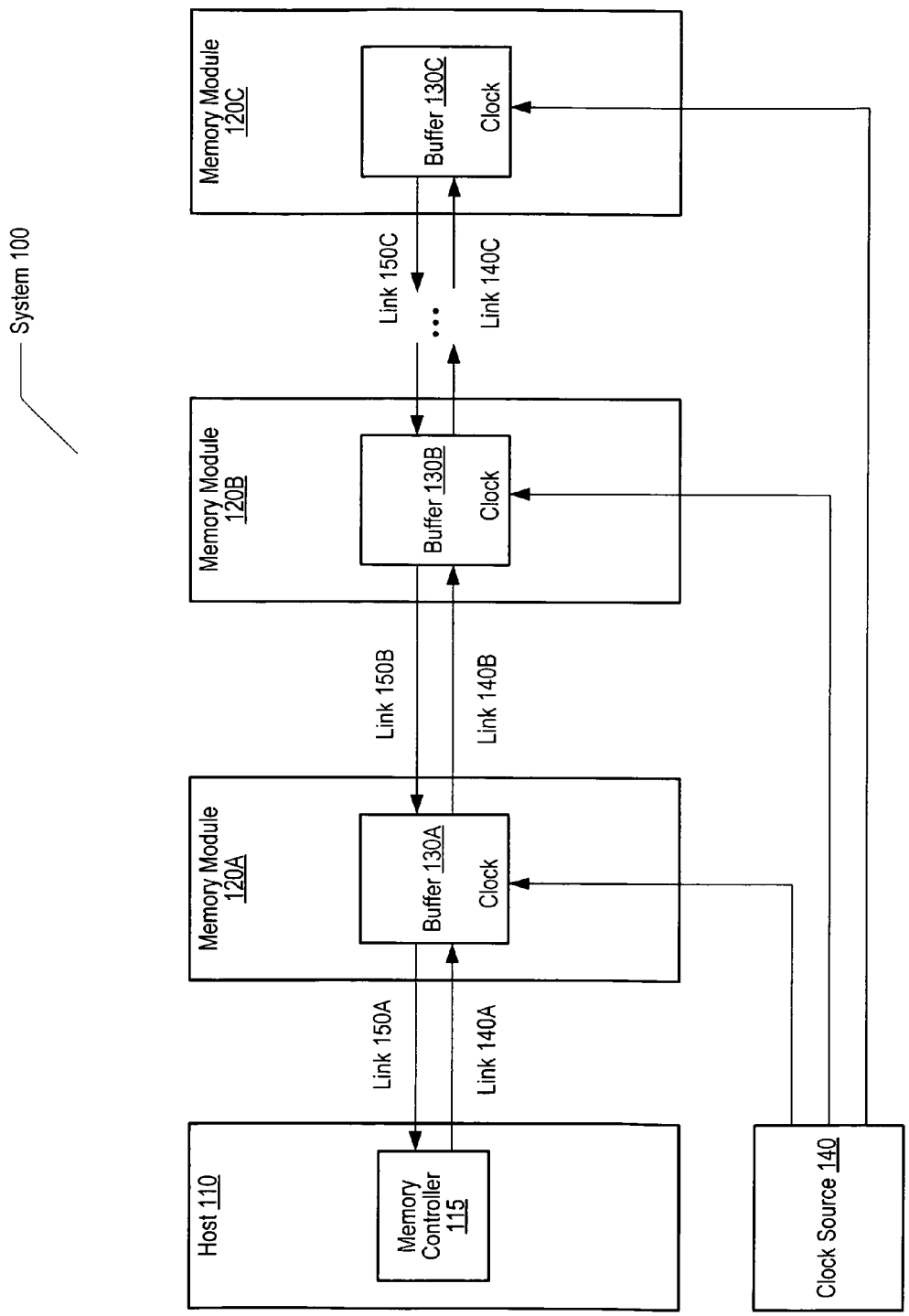
FIG. 1 is a generalized block diagram of one embodiment of a computer memory system.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a computer memory system 100 including a host 110, one or more memory modules 120A-120C, and a clock source 140. In the discussions that follow, elements designated by a number followed by a letter may be referred to collectively using the number alone. For example, memory modules 120A-120C may be referred to collectively as memory modules 120. In the illustrated embodiment, host 110 may be a processor that includes a memory controller 115. In an alternative embodiment, a processor and a memory controller may be separate elements of host 110.

In one embodiment, each of memory modules 120 may be a fully buffered dual inline memory module (FB-DIMM) that includes a respective buffer 130A-130C. Each of buffers 130 may provide an interface between an array of DRAM devices and other FB-DIMMs or host 110 within system 100. The JEDEC Solid State Technology Association has published a draft specification for FB-DIMMs. The JEDEC FB-DIMM specification includes descriptions of the operation of a compliant memory module including the characteristics of buffers, the memory devices that populate memory modules, and the interconnection architecture of FB-DIMMs in a memory system. For example, buffers 130 may comply with an Advanced Memory Buffer (AMB) specification that is included in the FB-DIMM specification. Another aspect of the current FB-DIMM specification requires that an FB-DIMM-compliant memory module may be populated with double data rate 2 synchronous dynamic random access memory (DDRII SDRAM) devices. Alternatively, and/or in future revisions of the JEDEC Specification, FB-DIMMs that support other DRAM technologies such as DDR3 are possible and are contemplated.

In one embodiment, memory modules 120 and memory controller 115 may be interconnected via a number of serial links. For example, memory controller 115 may be coupled to buffer 130A through a bi-directional pair of links 140A and 150A that comply with the section of the JEDEC FB-DIMM specification that covers interconnection of memory modules. Additional links 140B and 150B may interconnect buffers 130A and 130B and so on, forming a ring. Each of links 140 and 150 may comprise a set of parallel lanes. Although only three memory modules 120 are illustrated in FIG. 1, more or less than three memory modules may be interconnected in the ring. For example, the JEDEC FB-DIMM specification describes support for up to eight memory modules in the ring, with each module including one or two memory ranks. A memory rank may be defined as a set of memory devices that are accessed by a single chip select signal. Consequently, according to the FB-DIMM specification there may be from 1 to 16 individually addressable ranks of memory accessible to memory controller 115. Accordingly, in FB-DIMM-compliant embodiments, system 100 may include from one to sixteen memory ranks. In alternative embodiments, system 100 may include any number of memory ranks, including more than sixteen memory ranks.

Each buffer 130 may receive a clock signal from clock source 140. In the illustrated embodiment, clock source 140 provides a separately buffered reference clock to each of buffers 130. The clock frequency may be one of a variety of frequencies that depend on the capabilities of the DRAM devices of each FB-DIMM. For example, common FB-DIMM devices may receive a reference clock of 133 MHz, 167 MHz, or 200 MHz and achieve a data rate of 532 MHz, 667 MHz, or 800 MHz, respectively. In order to reduce power consumption, buffer 130 may be placed in a low latency standby state referred to as "L0s", in response to an L0s enable command received from memory controller 115. In the discussions that follow, placing a buffer in the L0s state may be referred to as L0s throttling. A detailed description of the generation and transmission of L0s enable commands is provided below.

During the operation of system 100, requests to access memory modules 120 are initiated by software executing within host 110. Among the memory requests that may be conveyed to memory modules 120 are read, write, initialization, control, and synchronization requests. In one embodiment, memory requests may be processed by memory controller 115 and conveyed to memory modules 120 within a frame of a fixed number of bits. Such requests may be referred to as "southbound" requests. For example, in one embodiment, a southbound write request comprises address, data, and command information packaged as a frame of 12 bits on each of ten lanes comprising links 140. Responses from memory modules 120 may also be conveyed back to memory controller 115 within a frame of a fixed number of bits. Such requests may be referred to as "northbound" requests. For example, in a further embodiment, a northbound response to a read request comprises data packaged as a frame of between 12 to 14 bits on each of 12 lanes comprising links 150. Alternatively, the number of bits per frame and the number of lanes per link may vary from embodiment to embodiment depending on the desired aggregate bandwidth, space constraints on the number of connections, and other design criteria. In one embodiment, L0s enable commands may be sent within particular southbound request frames, referred to as sync frames, that are sent to each FB-DIMM periodically. One example of the format of a sync frame containing an L0s enable command is given below.

Figure 2:
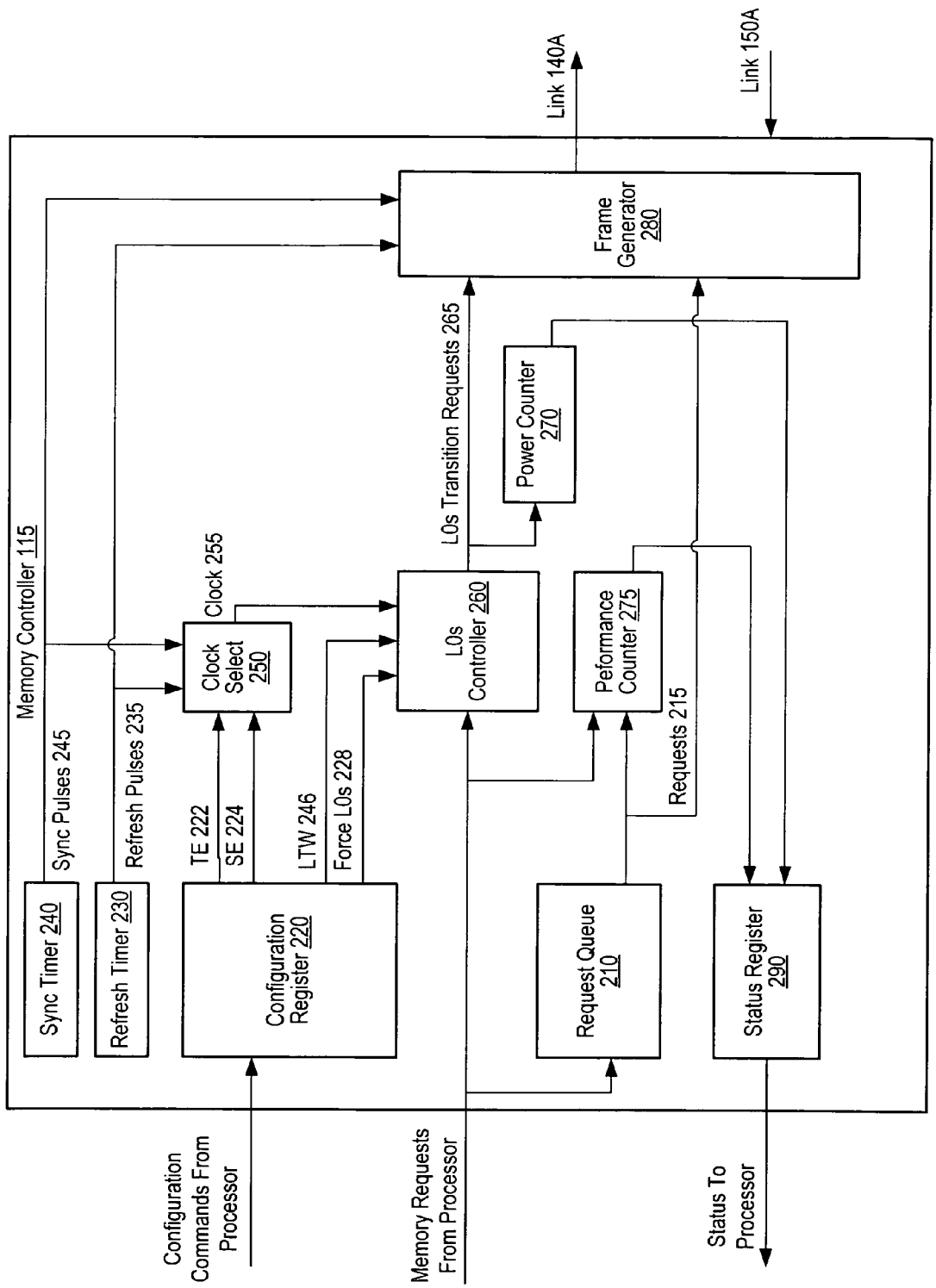
FIG. 2 is a generalized block diagram of one embodiment of a memory controller.

FIG. 2 is a generalized block diagram of one embodiment of memory controller 115. In the illustrated embodiment, memory controller 115 includes a request queue 210, a configuration register 220, a refresh timer 230, a sync timer 240, a clock select 250, an L0s controller 260, a power counter 270, a performance counter 275, a frame generator 280 and status register 290. Request queue 210 may be coupled to and receive memory requests from a processor within host 110. Generally speaking, memory requests may be any attempts to read data from, or write data to, one or more of the memory ranks within memory modules 120. Queuing memory requests may permit memory controller 115 to accept new memory requests without waiting for the completion of transactions associated with any previous, pending memory requests. For instance, in one embodiment, host 110 may include a multithreaded processor in which each of several threads may execute in parallel. While one such thread is waiting for the completion of a memory request that has been placed in request queue 210, other threads may continue to execute.

Memory controller 115 may be configured for operation via configuration register 220. Configuration register 220 may receive configuration commands from a processor within host 110. Configuration variables whose values may be set within configuration register 220 include refresh enable (TE) 222, sync enable (SE) 224, L0s Transition Window (LTW) 226, and force L0s 228. TE 222 is a binary variable, the value of which, when asserted, specifies that the unit of time measurement for monitoring the occurrence of memory requests in order to enable a transition to the L0s state is a memory refresh interval. Similarly, SE 224 is a binary variable, the value of which, when asserted, specifies that the unit of time measurement for monitoring the occurrence of memory requests in order to enable a transition to the L0s state is a sync interval. LTW 226 is an integer variable whose value determines how long to wait before determining whether or not to request an L0s transition. More specifically, the value of the configuration variable LTW 226 specifies how many memory refresh or sync intervals may be used to determine whether or not to transition to the L0s state, depending on the values of TE and SE. Host 110 may be configured to ensure that either TE or SE is asserted, but not both, at any given time. Force L0s 228 is a binary variable, the value of which, when asserted, specifies that the L0s state will be enabled at the conclusion of each LTW for at least one sync interval, irrespective of the number of memory requests that were received during the LTW.

Memory controller 115 may evaluate the stream of memory requests from the processor in order to identify opportunities to enable the L0s state of one or more buffers 130 of memory modules 120. Specifically, L0s controller 260 may receive the stream of memory requests from the processor in order to determine when to enable the L0s state for each memory module.

In one embodiment, the operation of L0s controller 260 is controlled by the values of force L0s 228, LTW 226, and a clock 255 received from clock select 250. As illustrated, clock select 250 may be coupled to refresh timer 230 and sync timer 240. Clock select 250 also receives TE 222 and SE 224 as inputs. In operation, if TE 222 is asserted, then clock select 250 may forward refresh pulses 235 from refresh timer 230 to L0s controller 260 as clock 255. Alternatively, if SE 224 is asserted, then clock select 250 may forward sync pulses 245 from sync timer 240 to L0s controller 260 as clock 255. The functions of L0s controller 260 are described further below.

L0s controller 260 may, under operating conditions to be described below, generate one or more L0s transition requests 265 that are conveyed to power counter 270 and frame generator 280. Frame generator 280 may package L0s transition requests 265 into a command frame for transmission to memory modules 120 via link 140A. Frame generator 280 may also package memory requests 215 into frames. For example, frame generator 280 may receive one or more requests 215 from request queue 210, package them into a frame, convey the frame to one or more of memory modules 120 via link 140A, and await a response or acknowledgement on link 150A. Frame generator 280 may also monitor northbound responses to southbound frames for individual memory modules 120. If a memory module is busy (i.e., has not yet responded to a read request), frame generator 280 may block de-queuing of a subsequent request targeted to the busy memory module until a response has been received. A variety of alternative de-queuing methods may be implemented between request queue 210 and frame generator 280. In addition, frame generator 280 may, in response to a sync pulse 245 from sync timer 240, transmit a sync frame to memory modules 120 in order to maintain clock synchronization within buffers 130. Frame generator 280 may also monitor refresh timer 230 and may, in response to receiving a refresh pulse 235, determine an interval in which a memory refresh may occur. During a memory refresh interval, one or more rows of each DRAM device may be refreshed according to well-known DRAM refresh techniques used to prevent loss of stored data. Detailed descriptions of the timing relationships among sync pulses, refresh pulses, and L0s throttling are given below.

The operation of memory controller 115 may be monitored by host 110 via power counter 270, performance counter 275, and status register 290. As noted above, L0s transition requests 265 may be received by power counter 270, which may maintain a count of the number of L0s transitions made for each memory module 120 in a software configurable sample period. These counts may be stored in status register 290 for access from a processor of host 110. Similarly, performance counter 275 may receive memory requests from a processor and requests 215 from request queue 210, maintaining a count of the difference between the number of requests entering and exiting request queue 210 for each memory module 120 in a software configurable sample period. The resulting counts may be stored in status register 290 for access from a processor of host 110. The output from power counter 270 and performance counter 275 may be used by host 110 to fine tune the settings of force L0s 228 and LTW 226, so as to achieve a desired level of power savings and bandwidth utilization of each memory module 120.

Figure 3:
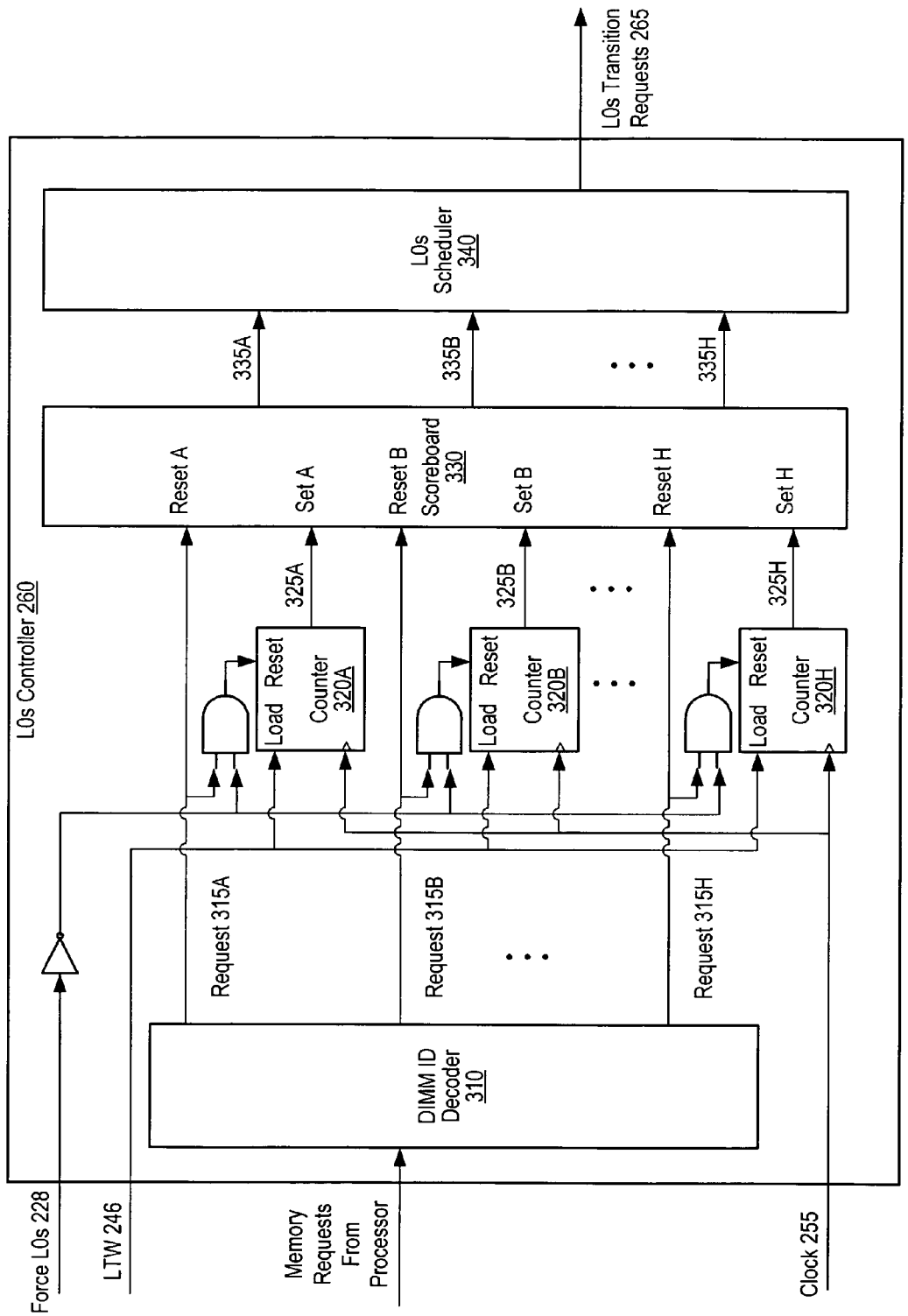
FIG. 3 is a block diagram of one embodiment of an L0s controller.

FIG. 3 is a block diagram of one embodiment of L0s controller 260. In the illustrated embodiment, L0s controller 260 includes a DIMM ID decoder 310 coupled to a series of counters 320A-320H and to a scoreboard 330. Scoreboard 330 is further coupled to an L0s scheduler 340 and to counters 320. Each of counters 320A-320H corresponds to a given memory module 120. Accordingly, the number of counters 320A-320H is not limited to eight and may vary from embodiment to embodiment and depend on the architecture and the number of memory modules 120 included in system 100.

In operation, DIMM ID decoder 310 receives memory requests from a processor within host 110. For each memory request, DIMM ID decoder 310 determines which memory module 120 is targeted by the request and forwards the request as one of requests 315A-315H to scoreboard 330 and to the counter 320 that corresponds to the targeted memory module 120.

In one embodiment, each of counters 320 may be configured as a count down counter. Each of counters 320 may be loaded with the value of LTW 246 in response to an update to configuration register 220. Counters 320 may be clocked by clock 255, i.e., counters 320 may count either sync pulses 245 or refresh pulses 235, depending on the configured values of TE 222 and SE 224. Counters 320 may be configured to load the value of LTW 246 immediately in response to counting down to "0". Also, if the value of a given one of counters 320 counts down to "1", the corresponding output 325 may be asserted. Each output 325 may assert a corresponding set input of scoreboard 330, signifying a request to issue an L0s enable command to the corresponding memory module 120. In addition, if DIMM ID decoder 310 decodes a request 315 for a given memory module 120, a reset signal may be sent to the corresponding reset input of scoreboard 330, signifying a request to issue an L0s disable command to the corresponding memory module 120. Scoreboard 330 may be read and scoreboard outputs 335A-335H latched by L0s scheduler 340 once per cycle of clock 255. For example, in one embodiment, scoreboard 330 may be read and latched one memory access cycle prior to the start of a cycle of clock 255. Therefore, one memory access cycle before a counter counts to "0", the scoreboard may be latched and an L0s transition to the enabled state may be requested at the next sync pulse 245 if the corresponding reset input has not been asserted. Conversely, an L0s transition to the disabled state may be requested at the next sync pulse 245 if a given scoreboard reset input is asserted during the previous cycle of clock 255.

Counters 320 may also have a reset input which, depending on the value of force L0s 228, may be asserted in response to requests 315. As shown in FIG. 3, each reset input may be coupled to the output of an AND gate whose inputs are request 315 and the complement of force L0s 228. Accordingly, if force L0s 228 is asserted, then the reset input may not be asserted and counters 320 may count down from the value of LTW 246 to a minimum value at regular intervals. However, if force L0s 228 is not asserted then counters 320 may be reset to the value of LTW 246 each time a request 315 occurs.

L0s scheduler 340 may latch scoreboard outputs 335 once per cycle of sync pulses 245 to determine if an L0s transition may be generated for one or more memory modules 120. In one embodiment, L0s scheduler 340 may perform a logical AND of scoreboard outputs 335 and send an L0s transition request to enable the L0s state for all memory modules 120 only if all scoreboard outputs 335 are asserted. In an alternative embodiment, for each scoreboard output 335, a corresponding request may be included in L0s transition requests 265, which are sent to frame generator 280. Frame generator 280 may send sequential L0s transition requests to each memory module or, alternatively, send a single L0s transition request with an address code that indicates which of memory modules 120 are to be transitioned to the L0s state. For example, an eight-bit address code may be conveyed to memory modules 120 with each bit indicating that a particular memory module may perform an L0s transition. Other schemes for addressing individual memory modules are possible and may be apparent to those skilled in the art.

It is noted that various alternative methods of detecting the duration of LTW 246 are possible. For example, counters 320 may count up from "0" to the value of LTW 246. Alternative counting methods may be apparent to those skilled in the art.

Figure 4:
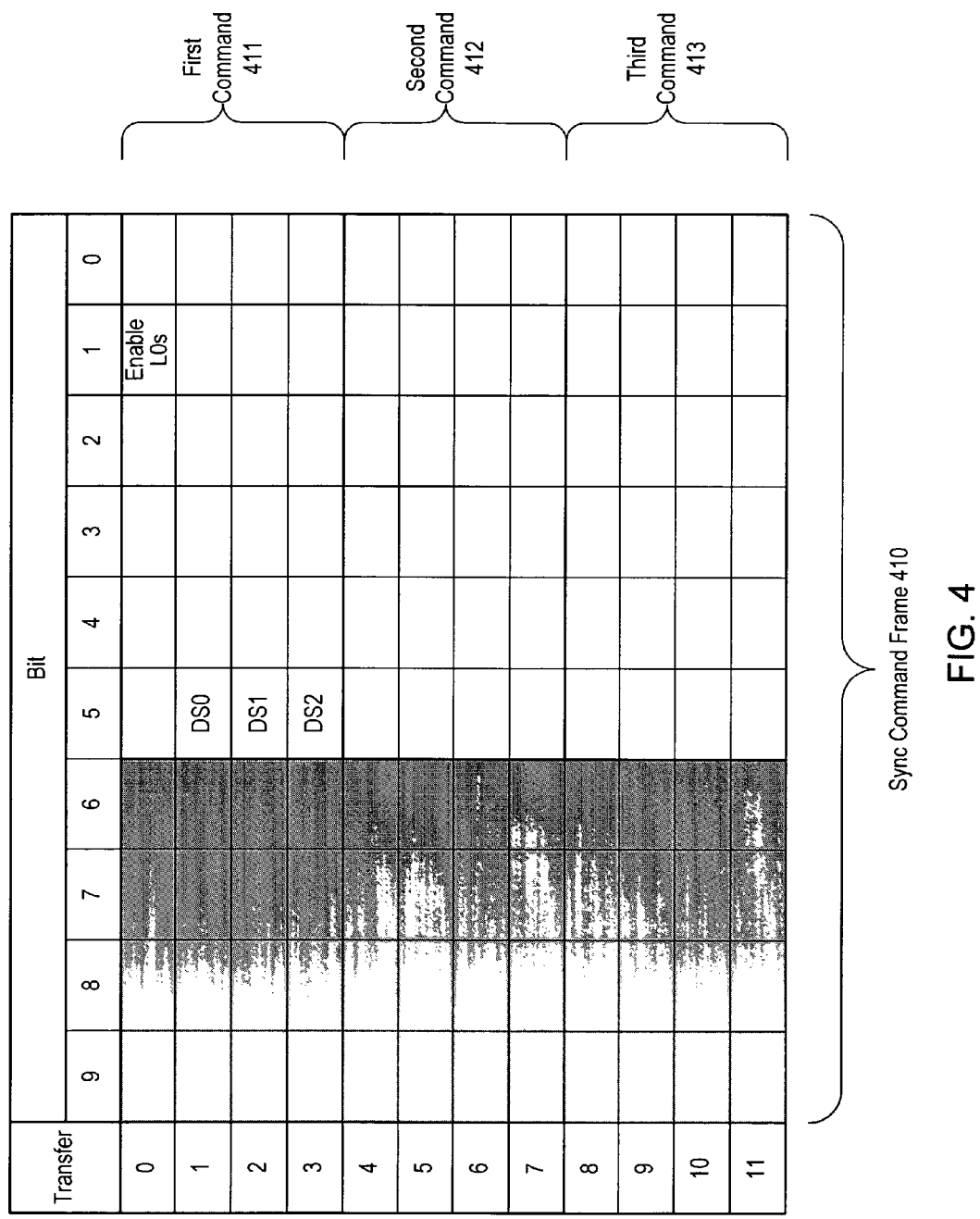
FIG. 4 illustrates one embodiment of the arrangement of bits in a sync command frame that includes an L0s transition request.

FIG. 4 illustrates one embodiment of the arrangement of bits in a sync command frame 410 that includes an L0s transition request. In the embodiment shown, sync command frame 410 may be packaged as a frame of 12 bits on each of ten lanes, which together constitute links 140. Accordingly, sync command frame 410 may comprise 120 bits. Up to three 24-bit commands may be packaged into a single command frame. The first 24-bit command may include an L0s transition request. Bit 1 (i.e., the second bit) of the first transfer is the enable L0s bit. In addition, a three bit address, shown as DS0-DS2, may be included in the first 24-bit command, comprising bit 5 of the second, third, and fourth transfers. Each of buffers 130 may decode the DS bits to determine if the 24-bit command is targeted to its associated memory module. If the DS bits match the identification of the memory module, the enable L0s bit is read to determine whether or not to place the given buffer 130 in an L0s state.

Various alternative embodiments of command frame 410 are possible and are contemplated. Any of a variety of predetermined associations between bit positions and individual memory modules 120 or individual memory ranks within memory modules 120 may be used. In one embodiment, the frame format complies with the FB-DIMM specification for a command frame. In an FB-DIMM compliant embodiment, a frame that includes an L0s transition request may be broadcast to every buffer 130 within a given channel of system 100. Bits DS0-DS2 are ignored. Alternatively, the position of the enable L0s bit and DS bits in a frame may be determined according to a variety of architectures other than the JEDEC FB-DIMM specification. In a further alternative embodiment, separate address bits in the command frame may be reserved for each of memory modules 120. If a particular address bit is asserted, then the corresponding memory module may perform an L0s transition according to the value of the enable L0s bit.

Figure 5:
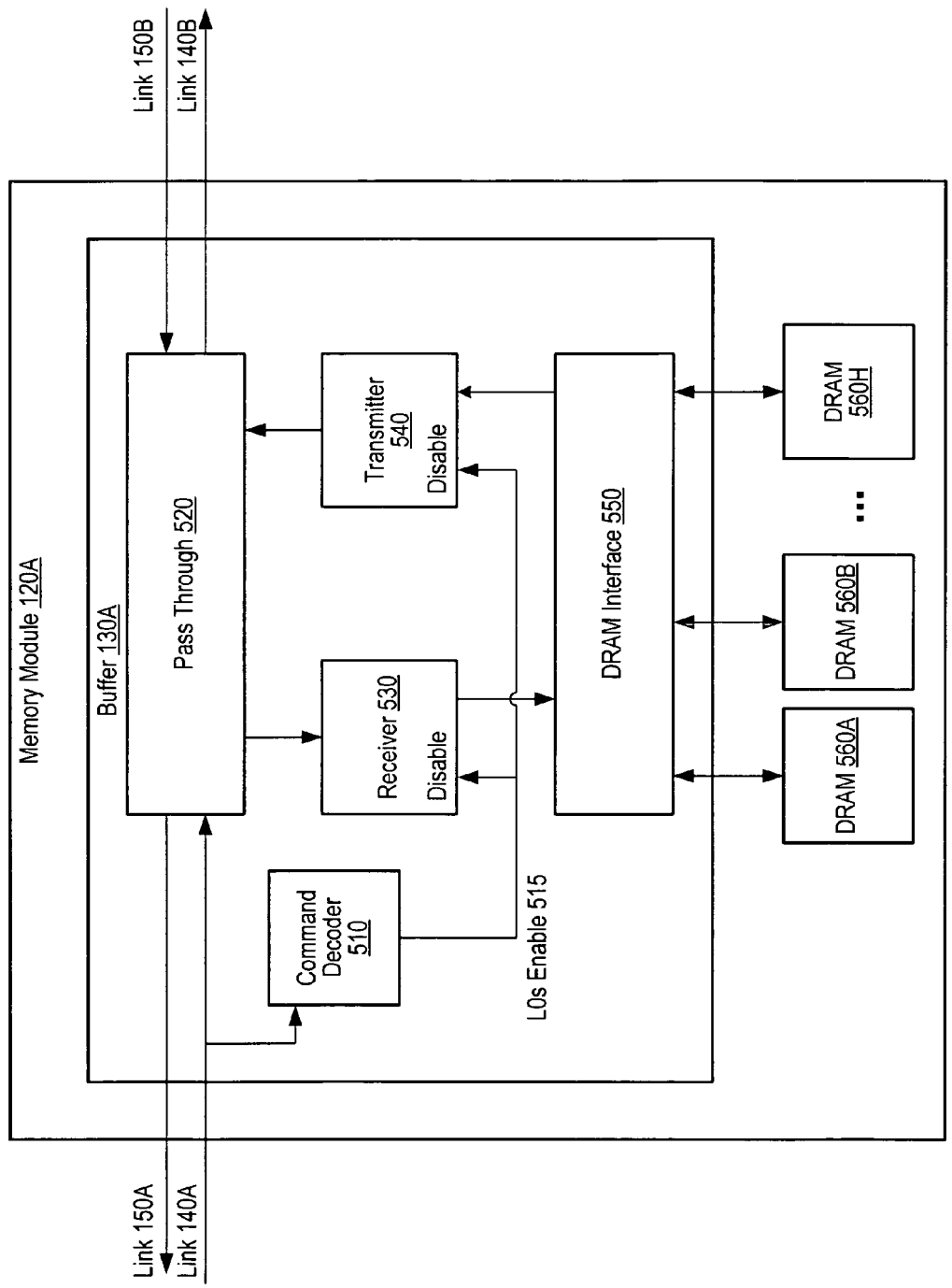
FIG. 5 is a generalized block diagram of one embodiment of a memory module.

FIG. 5 is a generalized block diagram of one embodiment of memory module 120A that may be representative of any of memory modules 120. In the illustrated embodiment, memory module 120A may include buffer 130A coupled to up to eight DRAM devices 560A-560H. As shown, buffer 130A may include a command decoder 510, pass through 520 circuitry, receiver 530, transmitter 540, and DRAM interface 550. In operation, command decoder 510 and pass through 520 may receive command frames from link 140A. Pass through 520 connects link 140A to link 140B in the southbound direction and link 150B to link 150A in the northbound direction. Pass through 520 is also shown coupled to receiver 530 and transmitter 540.

During operation, if Buffer 130 is in an active state and if a frame received on link 140A or 150B is targeted to memory module 120A, then pass through 520 may forward the frame to receiver 530. Similarly, if buffer 130 is in an active state, transmitter 540 may convey a frame to pass through 520 to be forwarded either northbound on link 150A or southbound on link 140B.

Command decoder 510 may receive command frames from link 140A that are targeted to buffer 130A. If the enable L0s bit in a received command frame is asserted, command decoder 510 may assert an enable L0s 515 signal. Conversely, if command decoder 510 detects a command frame targeted to buffer 130A in which the enable L0s bit is de-asserted, then enable L0s 515 may be de-asserted in response. Enable L0s 515 may be coupled to the disable inputs of receiver 530 and transmitter 540. If enable L0s 515 is asserted, receiver 530 and transmitter 540 may be disabled, thereby reducing the power consumption of buffer 130A. If enable L0s 515 is not asserted, then receiver 530 and transmitter 540 may convey data between DRAM interface 550 and pass through 520. DRAM interface 550 couples DRAM devices 560A-560H to receiver 530 and transmitter 540.

Figure 6:
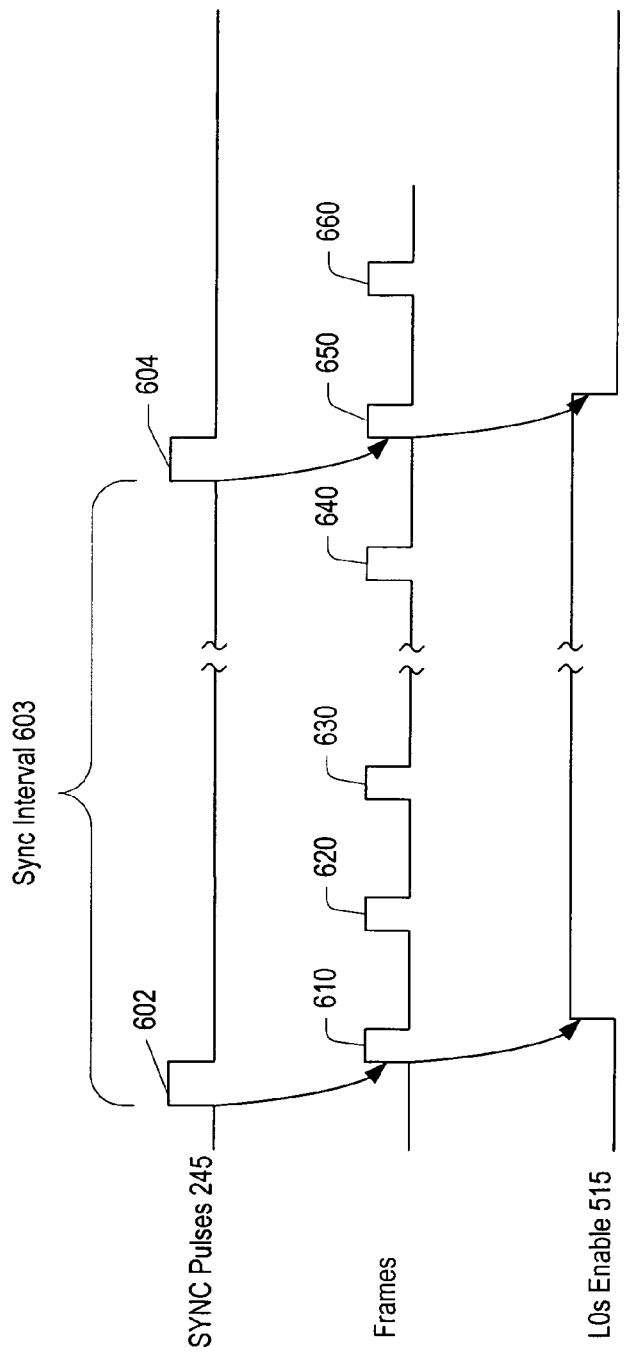
FIG. 6 illustrates one embodiment of the timing of sync pulses, command frames, and an L0s enable signal that may be used to enable or disable the L0s state.

FIG. 6 illustrates one embodiment of the timing of sync pulses 245, command frames, and L0s enable 515 that may be used to enable or disable the L0s state. In one embodiment, sync timer 240 generates a series of sync pulses 245 at regular intervals. Two sync pulses, 602 and 604, are shown, separated by a sync interval 603. Sync interval 603 may be a configurable number of memory access cycles long. In one embodiment, one frame is sent during each memory cycle. If a frame contains commands, it may be referred to as a command frame. A command frame that is transmitted in response to a sync pulse may be referred to as a sync frame. In a further embodiment, since the FB-DIMM specification requires a sync frame to be transmitted every 32 to 42 frames in order to keep buffers synchronized, the length of the sync interval may be configured to be at least 32 frames and no more than 42 frames.

As shown, sync pulse 602 may cause a sync frame 610 to be issued in which the enable L0s bit is asserted. Assertion of the enable L0s bit may in turn cause L0s enable 515 to be asserted, placing one or more buffers 130 in the L0s state. Subsequent frames 620-640 may not be sync frames and thus may not have the enable L0s bit asserted. In one embodiment, the L0s bit is only considered by buffer 130 to be valid if it is part of a sync frame. Therefore, buffer 130 may remain in the L0s state until a sync frame is received in which the L0s bit is de-asserted. Another sync pulse 604 may be transmitted one sync interval after sync pulse 602, causing a sync frame 650 to be issued. In the illustrated embodiment, the enable L0s bit is not asserted in frame 650, causing de-assertion of L0s enable 515 and re-enabling of portions of buffer 130 that were disabled in the L0s state. Alternatively, depending on the settings of memory controller 115, the software configuration within host 110, and the timing of memory access requests, the L0s bit may remain asserted during subsequent sync frames for any desired number of sync intervals. It is noted that according to the implementation described above, the L0s state persists for at least one sync interval.

Figure 7A:
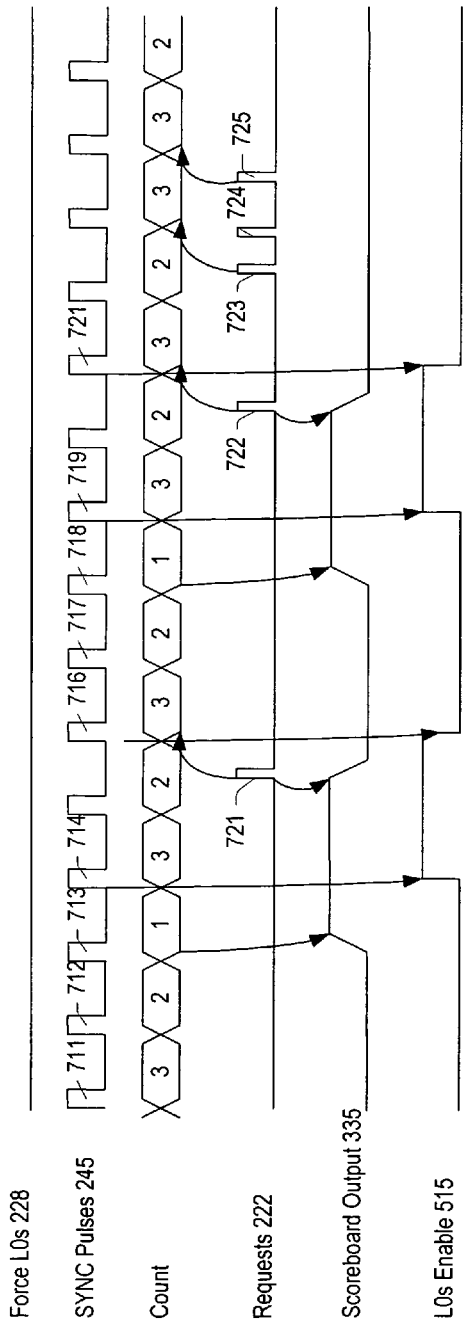
FIG. 7A illustrates one embodiment of the timing of signals that may be used to enable L0s throttling based on sync pulse intervals while force L0s is not asserted.

L0s throttling may be employed in a variety of ways to reduce the power dissipation of memory devices, depending on the operating mode of the computer memory system. FIGS. 7a, 7b, 8a, and 8b illustrate four different ways in which L0s throttling may be employed, depending on the values of force L0s 228, TE 222, and SE 224. FIG. 7a illustrates one embodiment of the timing of signals that may be used to enable L0s throttling based on sync pulse intervals while force L0s is not asserted. The illustrated signals are force L0s 228, sync pulses 245, a count value of a given counter 320, requests 222, scoreboard output 325, and L0s enable 515. In the example shown, force L0s 228 is de-asserted and it is assumed that the value of LTW is "3". Sync pulses 245 may be a series of pulses at regular intervals such as those produced by sync timer 240. As shown, sync pulses 245 include pulses 711-721. Requests 222 include a series of asynchronous pulses 721-725 representing memory requests for a particular memory module, such as those transmitted by DIMM ID decoder 310 as requests 222A. In one embodiment, counters 320 are clocked on the rising edge of sync pulses 245 and scoreboard output 335 and L0s enable 515 are generated as follows.

When memory controller 115 is initialized, counters 320 may be loaded with the value of LTW 246 and produce a low level output signal representing a de-asserted state as shown at the left side of FIG. 7a. As time progresses from left to right in the illustration, no requests 222 occur between sync pulses 711 and 712 and counter 320 counts down to "2" after sync pulse 712. Similarly, no requests 222 occur between sync pulses 712 and 713 and counter 320 counts down to "1". Having counted to "1", counter 320 may set a scoreboard bit. Similarly, no requests 222 occur between sync pulse 713 and 714 and counter 320 transitions from a count of "1" to a count of "3". One memory access cycle before counter 320 transitions, i.e., one memory access cycle before the rising edge of sync pulse 714, scoreboard output 335 may be latched, causing a sync command to be sent to buffer 130 in which the enable L0s bit is asserted. Buffer 130 may decode the command and assert L0s enable 515 in response. L0s enable 515 may remain asserted until a sync command is received in which the enable L0s bit is de-asserted. At the rising edge of sync pulse 714, counter 320 may be reset to the value of LTW 246, e.g., "3". In the illustration, request 721 causes counter 320 and a scoreboard bit to be reset. At the rising edge of sync pulse 716, the scoreboard may be read and a sync command sent to buffer 130 in which the enable L0s bit is de-asserted. Buffer 130 may decode the command and, as shown, de-assert L0s enable 515 in response.

In the illustrated example, since no requests 222 arrive between sync pulses 716 and 718, counter 320 counts down to "1", setting a scoreboard bit, and transitions to a count of "3", causing the scoreboard output to be latched and causing a sync command to be sent to buffer 130 in which the enable L0s bit is asserted. Buffer 130 may decode the command and assert L0s enable 515 in response. Subsequently, request 722 may cause counter 320 and the scoreboard bit to be reset. At the rising edge of sync pulse 721, the scoreboard may be read and a sync command sent to buffer 130 in which the enable L0s bit is de-asserted. Buffer 130 may decode the command and de-assert L0s enable 515 in response. Each of subsequent requests 723-725 may reset counter 320 and the scoreboard bit, preventing counter 320 from counting down to its minimum value.

Figure 7B:
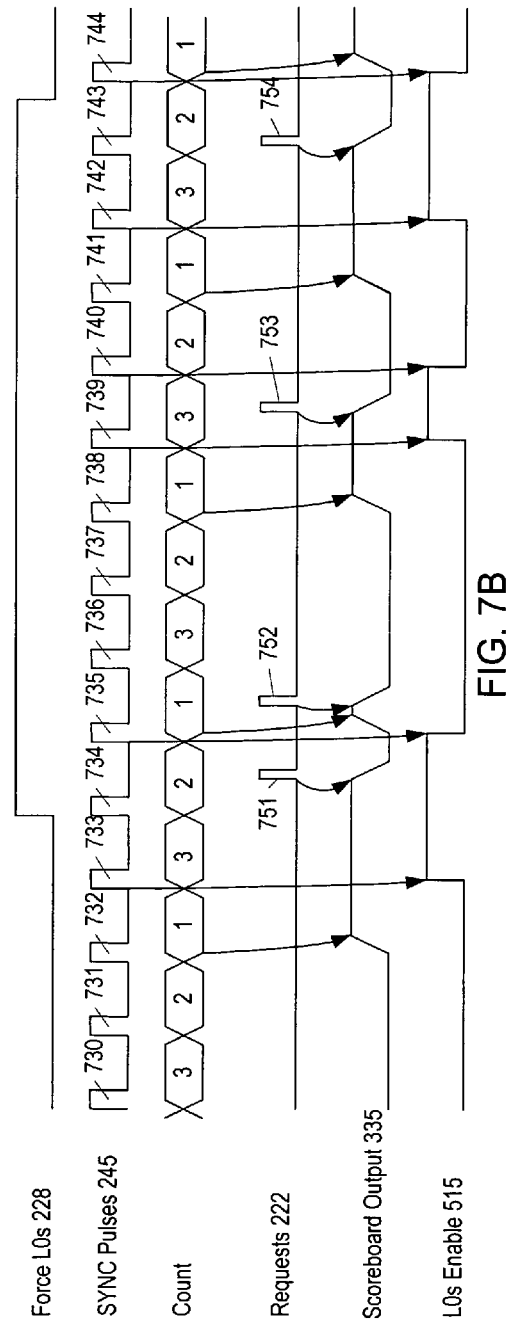
FIG. 7B illustrates one embodiment of the timing of signals that may be used to enable L0s throttling based on sync pulse intervals while force L0s is asserted.

FIG. 7b illustrates one embodiment of the timing of signals that may be used to enable L0s throttling based on sync pulse intervals while force L0s is asserted. The illustrated signals are force L0s 228, Sync Pulses 245, a count value of a given counter 320, requests 222, scoreboard output 325, and L0s enable 515. In the example shown, it is assumed that the value of LTW is "3". Sync Pulses 245 may be a series of pulses at regular intervals such as those produced by sync timer 240. As shown, sync pulses 245 include pulses 730-744. Requests 222 include a series of asynchronous pulses 751-754 representing memory requests for a particular memory module, such as those transmitted by DIMM ID decoder 310 as requests 222A. In one embodiment, counters 320 are clocked on the rising edge of sync pulses 245 and scoreboard output 335 and L0s enable 515 are generated as follows.

When memory controller 115 is initialized, counters 320 may be loaded with the value of LTW 246 and produce a low level output signal representing a dc-asserted state as shown at the left side of FIG. 7b. As time progresses from left to right in the illustration, no requests. 222 occur between sync pulses 730 and 731 and counter 320 counts down to "2" after sync pulse 731. Similarly, no requests 222 occur between sync pulses 731 and 732 and counter 320 counts down to "1". Having counted to "1", counter 320 may set a scoreboard bit. Similarly, no requests 222 occur between sync pulses 732 and 733 and counter 320 transitions from a count of "1" to a count of "3". One memory access cycle before counter 320 transitions i.e., one memory access cycle before the rising edge of sync pulse 733, scoreboard output 335 may be latched, causing a sync command to be sent to buffer 130 in which the enable L0s bit is asserted. Buffer 130 may decode the command arid assert L0s enable 515 in response. L0s enable 515 may remain asserted until a sync command is received in which the enable L0s bit is de-asserted. At the rising edge of sync pulse 733, counter 320 maybe reset to the value of LTW 246, e.g., "3".

The example of FIG. 7b differs from FIG. 7a mainly as a result of the way force L0s is set. In one embodiment, force L0s is controlled by a configuration command from a processor of host 110. In the illustrated example, force L0s 228 is asserted during the sync interval that starts with sync pulse 734. Subsequently, request 751 causes a scoreboard bit to be reset. However, because force L0s 228 is asserted, request 751 has no effect on counter 320. At the rising edge of sync pulse 735, the scoreboard may be read and a sync command sent to buffer 130 in which the enable L0s bit is de-asserted. Buffer 130 may decode the command and, as shown, de-assert L0s enable 515 in response.

Continuing with the description of FIG. 7b, counter 320 counts down to "1" on the rising edge of sync pulse 735. Having counted to "1", counter 320 may set a scoreboard bit. However, unlike the case of FIG. 7a; request 752 occurs between sync pulses 735 and 736, resetting the scoreboard bit. It is noted that request 752 has no effect on counter 320. Counter 320 transitions from a count of "1" to a count of "3". Scoreboard output 335 may be latched one memory access cycle before counter 320, transitions, i.e., one memory access cycle before the rising edge of sync pulse 736. Since the latched value, as shown, is "not asserted", a sync command may be sent to buffer 130 in which the enable L0s bit is de-asserted. Buffer 130 may decode the command and de-assert L0s enable 515 in response. Since counter 320 continues to count sync pulses, regardless of the occurrence of any request 222, sync pulses 738 and 739 may cause another L0s transition as described previously with regard to sync pulses 732 and 733. Requests 753 and 754 may have the same effect as request 752, etc.

Figure 8A:
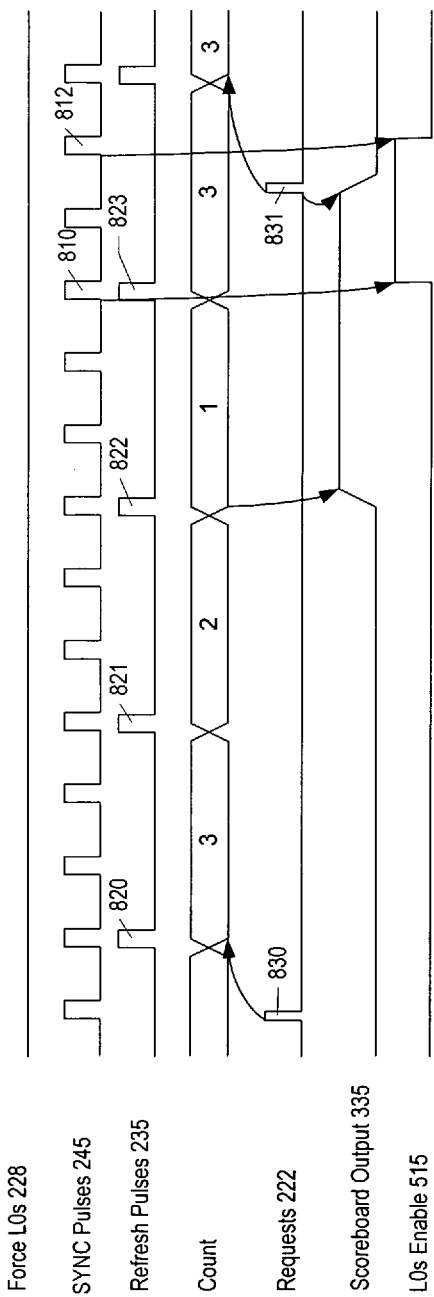
FIG. 8A illustrates one embodiment of the timing of signals that may be used to enable L0s throttling based on refresh pulse intervals while force L0s is not asserted.

FIG. 8a illustrates one embodiment of the timing of signals that may be used to enable L0s throttling based on refresh pulse intervals while force L0s is not asserted. The illustrated signals are force L0s 228, sync pulses 245, refresh pulses 235, a count value of a given counter 320, requests 222, scoreboard output 325, and L0s enable 515. In the example shown, force L0s 228 is de-asserted and it is assumed that the value of LTW is "3". Sync pulses 245 may be a series of pulses at regular intervals such as those produced by sync timer 240. As shown, sync pulses 245 include pulses 810 and 812. Refresh pulses 235 may be a series of pulses at regular intervals such as those produced by refresh timer 230. As shown, refresh pulses 235 include pulses 820-823. Requests 222 include pulses 830 and 831 representing memory requests for a particular memory module, such as those transmitted by DIMM ID decoder 310 as requests 222A. In one embodiment, counters 320 are clocked on the rising edge of sync pulses 245 and scoreboard output 335 and L0s enable 515 are generated as follows.

When memory controller 115 is initialized, counters 320 may be loaded with the value of LTW 246 and produce a low level Output signal representing a de-asserted state as shown at the left side of FIG. 8a. As time progresses from left to right in the illustration, request 830 occurs causing counter 320 and a scoreboard bit to be reset. Subsequently, during the interval between refresh pulses 820 and 821, no requests occur and counter 320 counts down to "2" after refresh pulse 821. Similarly, no requests 222 occur between refresh pulses 821 and 822 and counter 320 counts down to "1". Having counted to "1", counter 320 may set a scoreboard bit. Similarly, no requests 222 occur between refresh pulses 822 and 823 and counter 320 transitions from a count of "1" to a count of "3". One memory access cycle before counter 320 transitions, i.e., one memory access cycle before the rising edge of refresh pulse 823, scoreboard output 335 may be latched by L0s scheduler 340. Subsequently, on the rising edge of sync pulse 810, a sync command in which the enable L0s bit is asserted may be sent by frame generator 280 to buffer 130. Buffer 130 may decode the command and assert L0s enable 515 in response. L0s enable 515 may remain asserted until a sync command is received in which the enable L0s bit is de-asserted. Also at the rising edge of sync pulse 810, counter 320 may be reset to the value of LTW 246, e.g., "3". In the illustration, request 831 causes counter 320 and a scoreboard bit to be reset. At the rising edge of sync pulse 812, the scoreboard may be read and a sync command in which the enable buffer 130. Buffer 130 may decode the command and, as shown, de-assert L0s enable 515 in response.

Figure 8B:
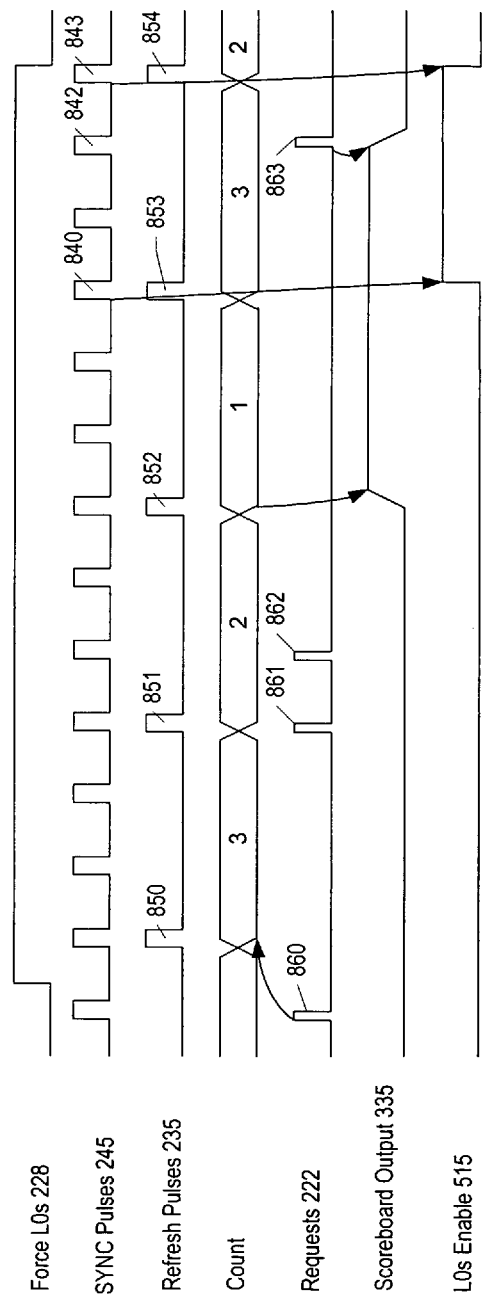
FIG. 8B illustrates one embodiment of the timing of signals that may be used to enable L0s throttling based on refresh pulse intervals while force L0s is asserted.

FIG. 8b illustrates one embodiment of the timing of signals that may be used to enable L0s throttling based on refresh pulse intervals while force L0s is asserted. The illustrated signals are force L0s 228, sync pulses 245, refresh pulses 235, a count value of a given counter 320, requests 222, scoreboard output 325, and L0s enable 515. In the example shown, it is assumed that the value of LTW is "3". Sync pulses 245 may be a series of pulses at regular intervals such as those produced by sync timer 240. As shown, sync pulses 245 include pulses 840 and 842. Refresh pulses 235 may be a series of pulses at regular intervals such as those produced by refresh timer 230. As shown, refresh pulses 235 include pulses 850-854. Requests 222 include a series of asynchronous pulses 860-863 representing memory requests for a particular memory module, such as those transmitted by DIMM ID decoder 310 as requests 222A. In one embodiment, counters 320 are clocked on the rising edge of sync pulses 245 and scoreboard output 335 and L0s enable 515 are generated as follows.

When memory controller 115 is initialized, counters 320 may be loaded with the value of LTW 246 and produce a low level output signal representing a de-asserted state as shown at the left side of FIG. 8a. As time progresses from left to right in the illustration, request 830 occurs causing counter 320 and a scoreboard bit to be reset. Subsequently, during the interval between refresh pulses 820 and 821, no requests occur and counter 320 counts down to "2" after refresh pulse 821. Similarly, no requests 222 occur between refresh pulses 821 and 822 and counter 320 counts down to "1". Having counted to "1", counter 320 may set a scoreboard bit. Similarly, no requests 222 occur between refresh pulses 822 and 823 and counter 320 transitions from a count of "1" to a count of "3". One memory access cycle before counter 320 transitions, i.e., one memory access cycle before the rising edge of refresh pulse 823, scoreboard output 335 may be latched by L0s scheduler 340. Subsequently, on the rising edge of sync pulse 810, a sync command in which the enable L0s bit is asserted may be sent by frame generator 280 to buffer 130. Buffer 130 may decode the command and assert L0s enable 515 in response. L0s enable 515 may remain asserted until a sync command is received in which the enable L0s bit is de-asserted. Also at the rising edge of sync pulse 810, counter 320 may be reset to the value of LTW 246, e.g., "3". In the illustration, request 831 causes counter 320 and a scoreboard bit to be reset. At the rising edge of sync pulse 812, the scoreboard may be read and a sync command in which the enable buffer 130. Buffer 130 may decode the command and, as shown, de-assert L0s enable 515 in response.

Figure 9:
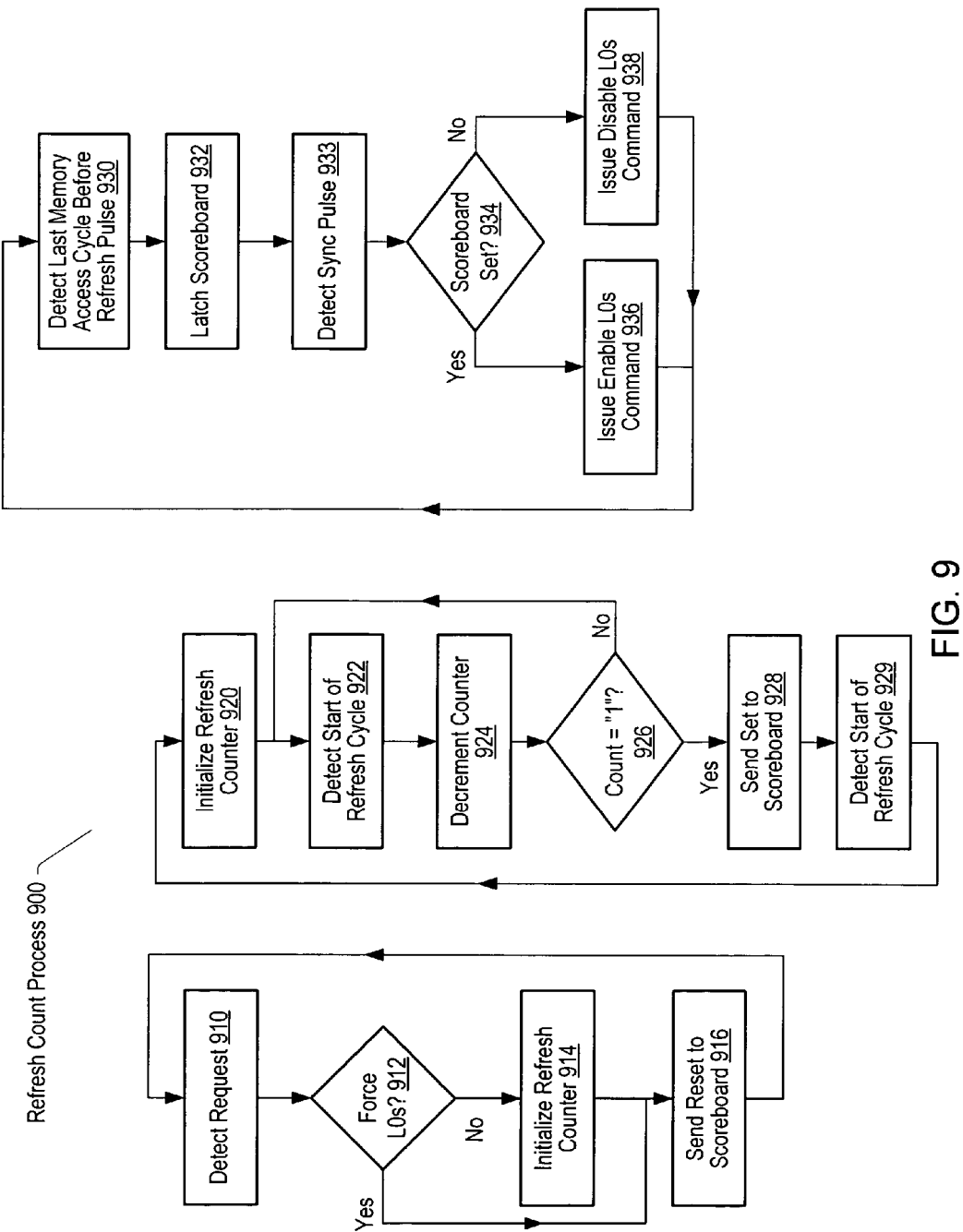
FIG. 9 illustrates one embodiment of a refresh count process that may be used to control L0s throttling of a given memory module.

FIG. 9 illustrates one embodiment of a refresh count process 900 that may be used to control L0s throttling of a given memory module. As shown, process 900 comprises three concurrently executed sub-processes. Blocks 910-916 depict a sub-process that may be used to monitor the occurrence of memory requests targeted at a given memory module. Blocks 920-929 depict a sub-process that may be used to count refresh pulses. Blocks 930-938 depict a sub-process that may be used to monitor the status of a scoreboard bit that corresponds to a given memory module and generate L0s enable and disable commands.

The first sub-process of process 900 may, in one embodiment, begin with the detection of a memory request (block 910). Once a request is detected, the status of force L0s is determined (decision block 912). If force L0s is not asserted, a refresh pulse counter may be initialized to the value of the LTW (block 914). In addition, or if force L0s is asserted, the scoreboard bit may be reset, indicating that at least one memory request has been queued (block 916). The first sub-process of process 900 may then continue to detect memory requests (block 910).

The second sub-process of process 900 may, in one embodiment, begin with the initialization of a refresh pulse counter to the value of the LTW (block 920). Each refresh pulse may then be detected (block 922), causing the refresh pulse counter to be decremented (block 924). The count value may be checked (decision block 926). If the count value is greater than "1", the refresh pulse counter continues to detect refresh pulses (block 922). If the count value is equal to "1", a set input to a scoreboard bit may be asserted, indicating a request to enable the L0s state for a given memory module (block 928). Upon detection of the next refresh pulse (block 929), the second sub-process of process 900 may repeat by returning to the initialization of the refresh pulse counter (block 920).

The third sub-process of process 900 may, in one embodiment, begin with the detection of the last memory access cycle before the start of a refresh pulse (block 930). A scoreboard bit may be latched during the last memory access cycle before the start of a refresh pulse (block 932). Subsequently, after detecting the start of the next sync pulse (block 933), the scoreboard output may be checked (decision block 934). If the scoreboard bit is set, a sync command in which the enable L0s bit is asserted may be sent to the given memory module (block 936). Otherwise, if the scoreboard bit is not set, a sync command in which the enable L0s bit is de-asserted may be sent to the given memory module (block 938). The third sub-process of process 900 may then repeat by returning to the detection of the last memory access cycle before the start of a refresh pulse (block 930).

Figure 10:
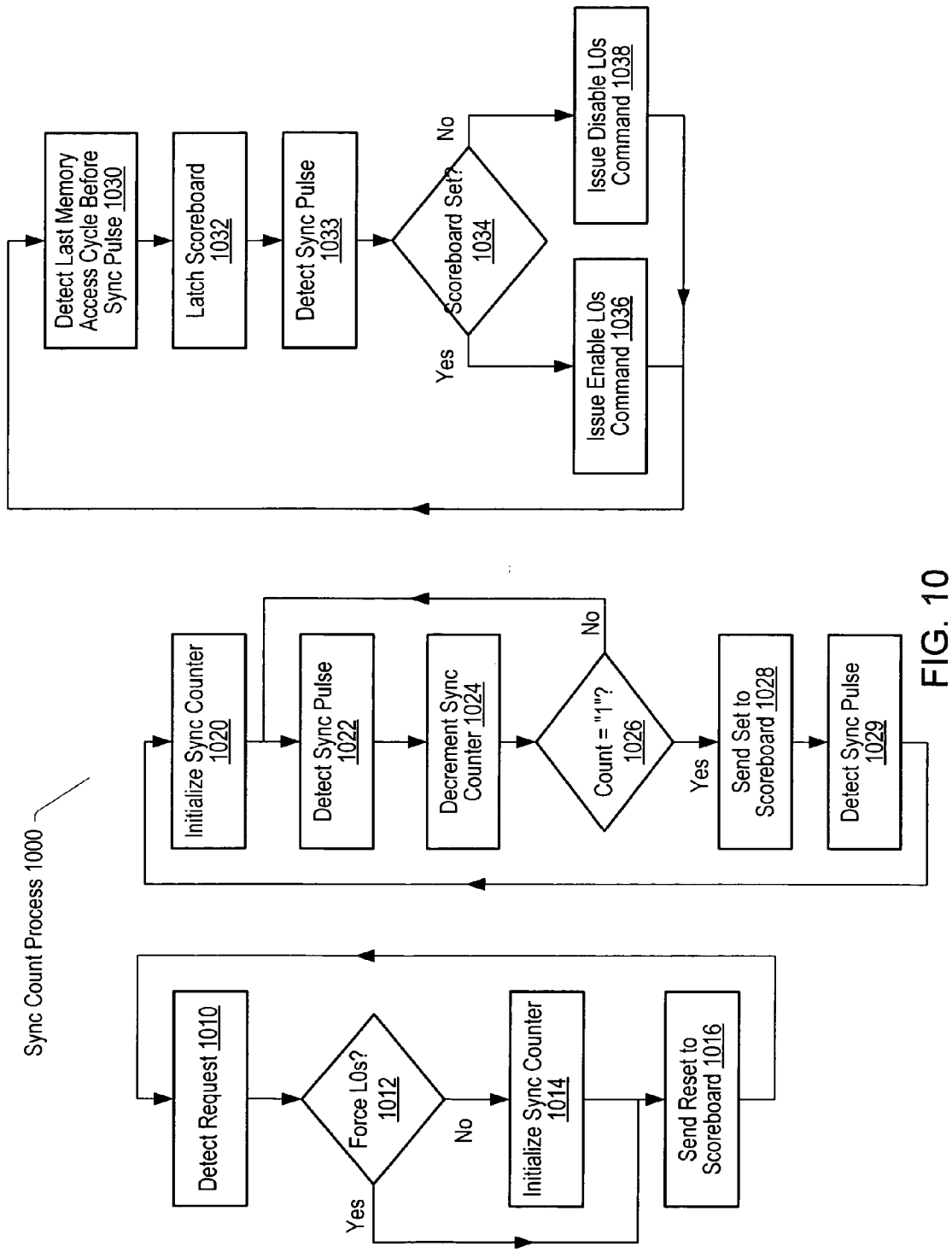
FIG. 10 illustrates one embodiment of a sync count process that may be used to control L0s throttling of a given memory module.

FIG. 10 illustrates one embodiment of a sync count process 1000 that may be used to control L0s throttling of a given memory module. As shown, process 1000 comprises three concurrently executed sub-processes. Blocks 1010-1016 depict a sub-process that may be used to monitor the occurrence of memory requests targeted at a given memory module. Blocks 1020-1029 depict a sub-process that may be used to count sync pulses. Blocks 1030-1038 depict a sub-process that may be used to monitor the status of a scoreboard bit that corresponds to a given memory module and generate L0s enable and disable commands.

The first sub-process of process 1000 may, in one embodiment, begin with the detection of a memory request (block 1010). Once a request is detected, the status of force L0s is determined (decision block 1012). If force L0s is not asserted, a sync pulse counter may be initialized to the value of the LTW (block 1014). In addition, or if force L0s is asserted, the scoreboard bit may be reset, indicating that at least one memory request has been queued (block 1016). The first sub-process of process 1000 may then continue to detect memory requests (block 1010).

The second sub-process of process 1000 may, in one embodiment, begin with the initialization of a sync pulse counter to the value of the LTW (block 1020). Each sync pulse may then be detected (block 1022), causing the sync pulse counter to be decremented (block 1024). The count value may be checked (decision block 1026). If the count value is greater than "1", the sync pulse counter continues to detect sync pulses (block 1022). If the count value is equal to "1", a set input to a scoreboard bit may be asserted, indicating a request to enable the L0s state for a given memory module (block 1028). Upon detection of the next sync pulse (block 1029), the second sub-process of process 1000 may repeat by returning to the initialization of the sync pulse counter (block 1020).

The third sub-process of process 1000 may, in one embodiment, begin with the detection of the last memory access cycle before the start of a sync pulse (block 1030). A scoreboard bit may be latched during the last memory access cycle before the start of a sync pulse (block 1032). Subsequently, after detecting the start of the next sync pulse (block 1033), the scoreboard output may be checked (decision block 1034). If the scoreboard bit is set, a sync command in which the enable L0s bit is asserted may be sent to the given memory module (block 1036). Otherwise, if the scoreboard bit is not set, a sync command in which the enable L0s bit is de-asserted may be sent to the given memory module (block 1038). The third sub-process of process 1000 may then repeat by returning to the detection of the last memory access cycle before the start of a sync pulse (block 1030).

Figure 11:
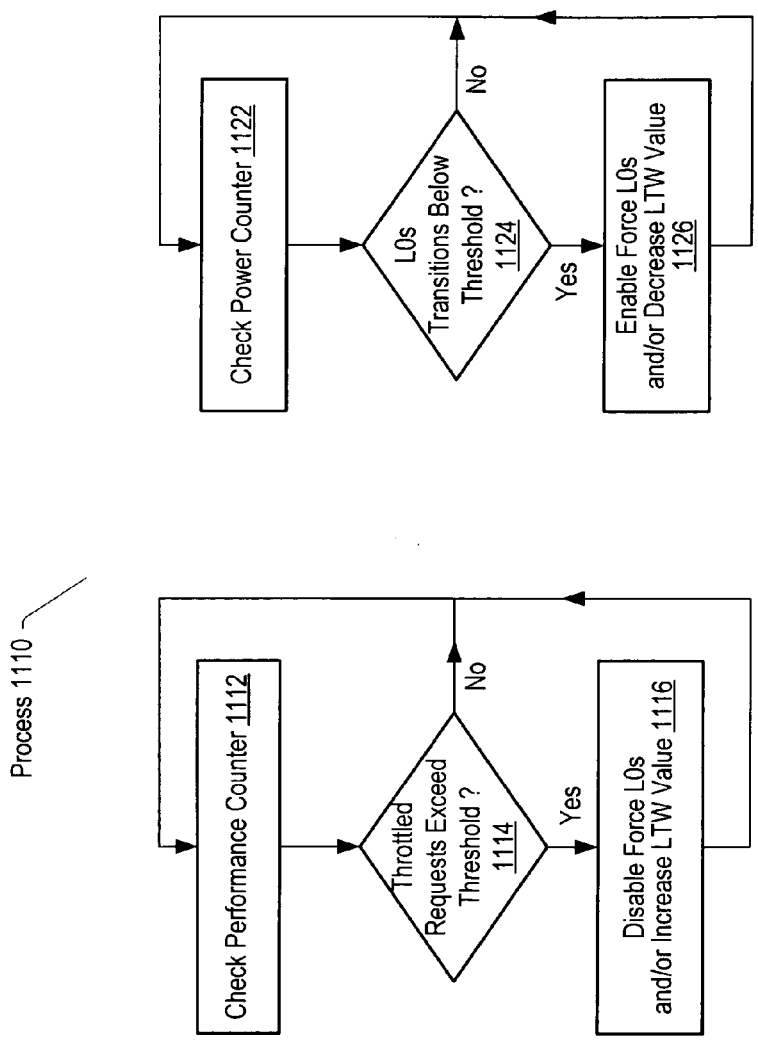
FIG. 11 illustrates one embodiment of a process that may be used to monitor L0s throttling.

FIG. 11 illustrates one embodiment of a process 1110 that may be used to monitor L0s throttling for one or more memory modules 120. As shown, process 1100 comprises two concurrently executed sub-processes. The first sub-process of process 1100 may, in one embodiment, begin with a check of a performance counter (block 1112). The value of the performance counter may provide an indication of the number of memory requests that are throttled in a given period of time. If the number of throttled requests exceeds a configurable threshold (decision block 1114), one or more configuration changes may be made to L0s throttling (block 1116). For example, force L0s may be disabled if it is enabled. Alternatively, or in addition, the value of the LTW may be increased. Upon completing changes to the configuration of L0s throttling, or if the number of throttled requests does not exceed the configurable threshold, the first sub-process may, after a suitable time delay, repeat checking the value of the performance counter (block 1112).

The second sub-process of process 1100 may, in one embodiment, begin with a check of a power counter (block 1122). The value of the power counter may provide an indication of the number of L0s transitions that are made in a given period of time. If the number of L0s transitions is less than a configurable threshold (decision block 1124), one or more configuration changes may be made to L0s throttling (block 1126). For example, force L0s may be enabled if it is disabled. Alternatively, or in addition, the value of the LTW may be decreased. Upon completing changes to the configuration of L0s throttling, or if the number of L0s transitions is not less than the configurable threshold, the second sub-process may, after a suitable time delay, repeat checking the value of the power counter (block 1122).

It is noted that the above described embodiments may comprise software. For example, the functionality of memory controller 115 may be implemented in hardware, software, firmware, or some combination of the above. In such embodiments, the program instructions which implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory system comprising:
 a memory controller coupled to one or more memory modules, at least one of the memory modules including a buffer;
 wherein the memory controller is configured to:
 convey a command to at least one of the memory modules in response to detecting that no memory requests addressed to the at least one of the memory modules have been received during a specified window of time; and
 change a duration of the specified window of time based on a comparison of a number of memory requests entering and exiting a memory request queue and number of times the buffer has entered a reduced power state during a given period of time;
 wherein in response to the command, the buffer of the at least one of the memory modules is configured to enter the reduced power state.

2. The system of claim 1,
 wherein the specified window of time comprises a specified number of refresh intervals; and
 wherein the memory controller is further configured to:
 maintain a count of memory refresh intervals; and
 each time the count reaches the specified number, determine whether or not any memory requests addressed to the at least one of the memory modules have been received during an immediately preceding window of time equal in duration to the specified window of time.

3. The system of claim 2, wherein the memory controller is further configured to:

restart said count in response to detecting that either a memory request addressed to the at least one of the memory modules has been received, or the count has reached the specified number.

4. The system of claim 1,
wherein the specified window of time comprises a specified number of buffer sync intervals; and
wherein to the memory controller is configured to:
maintain a count of buffer sync intervals; and
each time the count reaches the specified number:
restart the count of buffer sync intervals; and
determine whether or not any memory requests addressed to the at least one of the memory modules have been received during an immediately preceding window of time equal in duration to the specified window of time.

5. The system of claim 4, wherein the memory controller is further configured to:
restart said count in response to detecting that a memory request addressed to the at least one of the memory modules has been received.

6. The system of claim 1, wherein the memory controller is further configured to:
monitor one or more windows of time, each window corresponding to a respective memory module; and
convey a command to each memory module for which no memory requests have been received during the corresponding window of time, which causes the corresponding buffer to enter a reduced power state; and
wherein each buffer is configured to pass commands through to a next buffer while in the reduced power state.

7. A method of reducing power consumption in a memory subsystem, the method comprising:
conveying a command to at least one of one or more memory modules in response to detecting that no memory requests addressed to the at least one of the memory modules have been received during a specified window of time, wherein at least one of the memory modules comprises a buffer coupled to one or more memory devices; and
changing a duration of the specified window of time based on a comparison of a number of memory requests entering and exiting a memory request queue and a number of times the buffer has been placed in a reduced power state during a given period of time;
in response to the command, placing the buffer of the at least one of the memory modules into the reduced power state.

8. The method of claim 7, wherein the specified window of time comprises a specified number of refresh intervals, the method further comprising:
maintaining a count of memory refresh intervals;
each time the count reaches a specified number, determining whether or not any memory requests addressed to the at least one of the memory modules have been received during an immediately preceding window of time equal in duration to the specified window of time.

9. The method of claim 8, further comprising:
restarting the count in response to detecting that either a memory request addressed to the at least one of the memory modules has been received, or the count has reached the specified number.

10. The method of claim 7, wherein the specified window of time comprises a specified number of buffer sync intervals, the method further comprising:
maintaining a count of buffer sync intervals;
each time the count reaches a specified number, determining whether or not any memory requests addressed to the at least one of the memory modules have been received during an immediately preceding window of time equal in duration to the specified window of time.

11. The method of claim 10, further comprising:
restarting the count in response to detecting that either a memory request addressed to the at least one of the memory modules has been received, or the count has reached the specified number.

12. The method of claim 7, further comprising:
monitoring one or more windows of time, each window corresponding to a respective memory module; and
conveying a command to each memory module for which no memory requests have been received during the corresponding window of time, which causes the corresponding buffer to enter a reduced power state, wherein each buffer is configured to pass commands through to a next buffer while in the reduced power state.

13. A processor comprising:
a memory controller configured to be coupled to one or more memory modules, at least one of the memory modules including a buffer;
wherein the processor is configured to generate and convey memory requests to the memory controller;
wherein the memory controller is configured to:
convey a command to at least one of the memory modules in response to detecting that no memory requests addressed to the at least one of the memory modules have been received by the memory controller during a specified window of time; and
change a duration of the specified window of time based on a comparison of a number of memory requests entering and exiting a memory request queue and a number of times the has entered a reduced power state during a given period of time;
wherein in response to the command, the buffer of the at least one of the memory modules is configured to enter the reduced power state.

14. The processor of claim 13,
wherein the specified window of time comprises a specified number of refresh intervals; and
wherein the memory controller is further configured to:
monitor a status of the memory request queue;
maintain a count of memory refresh intervals; and
each time the count reaches the specified number, determine whether or not any memory requests addressed to the at least one of the memory modules have entered the memory request queue during an immediately preceding window of time equal in duration to the specified window of time.

15. The processor of claim 14, wherein the memory controller is further configured to:
restart the running count of memory refresh intervals in response to detecting that either a memory request has entered the memory request queue, or the count has reached the specified number.

16. The processor of claim 13,
wherein the specified window of time comprises a specified number of buffer sync intervals; and
wherein to the memory controller is configured to:
monitor a status of the memory request queue;
maintain a count of buffer sync intervals; and
each time the count reaches the specified number, determine whether or not any memory requests addressed to the at least one of the memory modules have entered the memory request queue during an immediately preceding window of time equal in duration to the specified window of time.

17. The processor of claim 16, wherein the memory controller is further configured to:
restart the count of buffer sync intervals in response to detecting that either a memory request has entered the memory request queue, or the count has reached the specified number.

18. The processor of claim 13, wherein the memory controller is further configured to:
monitor one or more windows of time, each window corresponding to a respective memory module; and
convey a command to each memory module for which no memory requests have been received during the corresponding window of time, which causes the buffer of the respective memory module to enter a reduced power state; and
wherein each buffer is configured to pass commands through to a next buffer while in the reduced power state.

19. A memory controller comprising:
a memory request queue configured to store received memory requests; and
circuitry configured to:
convey a command in response to detecting that no memory requests addressed to a particular memory module has been received by the memory controller during a specified window of time; and
change a duration of the specified window of time based on a comparison of a number of memory requests entering and exiting a memory request queue and a number of times a buffer of the particular memory module has entered a reduced power state during a given period of time;
wherein the command is configured to cause the buffer of the particular memory module to which it is addressed to enter the reduced power state.

20. The memory controller of claim 19,
wherein the specified window of time comprises a specified number of refresh intervals, and wherein the circuitry is further configured to:
monitor a status of the memory request queue;
maintain a count of memory refresh intervals; and
each time the count reaches the specified number, determine whether or not any memory requests addressed to the particular memory module have entered the memory request queue during an immediately preceding window of time equal in duration to the specified window of time.

21. The memory controller of claim 20, wherein the memory controller is further configured to:
restart the count of memory refresh intervals in response to detecting that either a memory request addressed to the particular memory module has entered the memory request queue, or the count has reached the specified number.

22. The memory controller of claim 19,
wherein the specified window of time comprises a specified number of buffer sync intervals; and
wherein to the memory controller is configured to:
monitor a status of the memory request queue;
maintain a count of buffer sync intervals; and
each time the count reaches the specified number, determine whether or not any memory requests addressed to the particular memory module have entered the memory request queue during an immediately preceding window of time equal in duration to the specified window of time.

23. The memory controller of claim 22, wherein the memory controller is further configured to:
restart the count of buffer sync intervals in response to detecting that either a memory request has entered the memory request queue, or the count has reached the specified number.

24. The memory controller of claim 19,
wherein the memory controller is further configured to:
monitor one or more windows of time, each window corresponding to a respective memory module; and
convey a command to each memory module for which no memory requests have been received during the corresponding window of time, which causes the buffer of the particular memory module to enter the reduced power state; and
wherein each buffer is configured to pass commands through to a next buffer while in the reduced power state.

* * * * *

UNITED STATES PATENT AND TRADEMARK OFFICE
CERTIFICATE OF CORRECTION

PATENT NO. : 7,496,777 B2 Page 1 of 1
APPLICATION NO. : 11/249099
DATED : February 24, 2009
INVENTOR(S) : Sanjiv Kapil It is certified that error appears in the above-identified patent and that said Letters Patent is hereby corrected as shown below:

<u>Column 16,</u>

Claim 13, Line 35, please delete "times the has entered a reduced power state during a" and substitute --times the buffer has entered a reduced power state during a.--.

Signed and Sealed this

Fourteenth Day of July, 2009

JOHN DOLL
*Acting Director of the United States Patent and Trademark Office*